United States Patent [19]

Burgess et al.

[11] Patent Number: 4,791,795

[45] Date of Patent: Dec. 20, 1988

[54] VEHICLE ANTI-THEFT DEVICE

[76] Inventors: Edward J. Burgess, 52 Glendale Grove, Glasheen Road, Cork; Timothy J. O'Sullivan, 3 Halcon Drive, Silversprings Tivoli, Cork, both of Ireland

[21] Appl. No.: 60,103

[22] Filed: Jun. 9, 1987

[30] Foreign Application Priority Data

Jul. 23, 1986 [IE] Ireland .................................. 1955/86

[51] Int. Cl.4 .............................................. F16H 57/00
[52] U.S. Cl. ........................................ 70/202; 70/211; 70/247
[58] Field of Search ................. 70/202, 203, 192, 195, 70/201, 207, 209, 210, 211, 212, 247, 248

[56] References Cited

U.S. PATENT DOCUMENTS

| 1,388,149 | 8/1921 | Friedrich | 70/203 |
| 3,710,606 | 1/1973 | Prince | 70/247 |
| 4,231,241 | 11/1980 | Lipski | 70/195 |

FOREIGN PATENT DOCUMENTS

| WO8606037 | 10/1986 | European Pat. Off. | 70/195 |
| 603983 | 1/1926 | France | 70/202 |
| 416526 | 11/1946 | Italy | 70/195 |
| 155058 | 12/1920 | United Kingdom | 70/195 |

Primary Examiner—Robert L. Wolfe
Attorney, Agent, or Firm—Daniel N. Lundeen

[57] ABSTRACT

A vehicle anti-theft device. The device is amenable for use with a vehicle having a gear lever. The device includes a removable housing which fits over and encloses the gear lever. The housing is locked in place to prevent movement of the gear lever by a bolt passing through the housing in interengagement with the gear lever and penetrating a barrel lock housing fixedly attached to the gear lever housing. The bolt has a head at one end which prevents rotation thereof, and a hole at the other end in mutual register with the bolt-engaging portion of the barrel lock. The locking of the housing in place over the gear lever prevents movement thereof so that the vehicle cannot be driven without unlocking the housing.

12 Claims, 4 Drawing Sheets

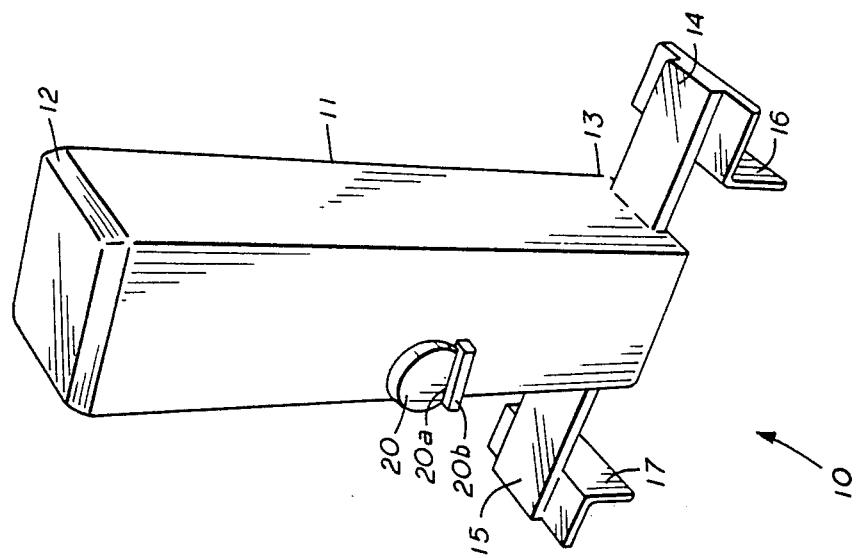
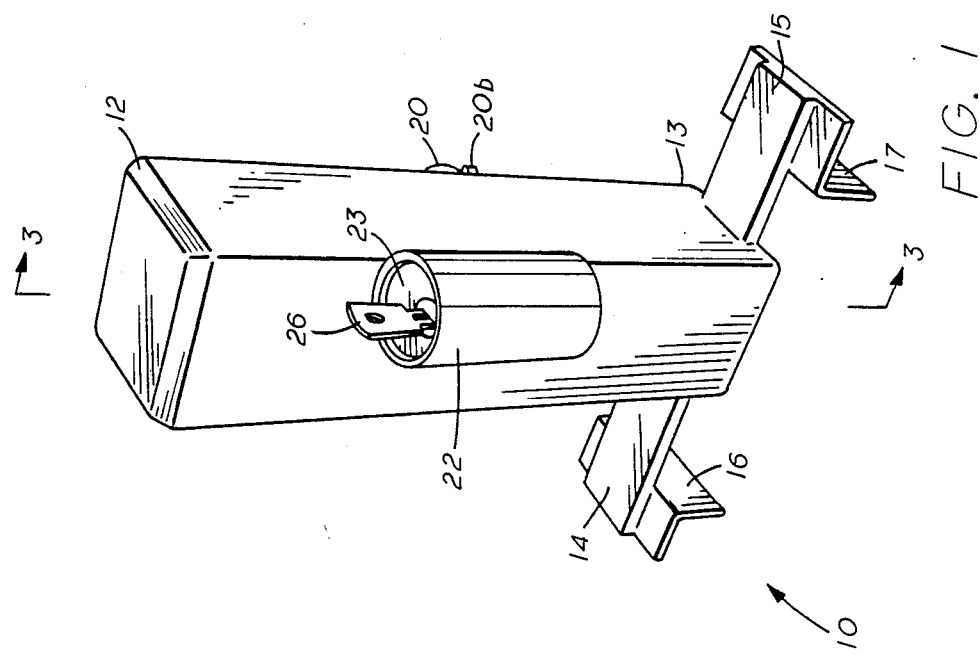

VEHICLE ANTI-THEFT DEVICE

FIELD OF THE INVENTION

This invention relates to a vehicle anti-theft device, and particularly to such a device which renders inoperable the gear shift mechanism of the transmission of the vehicle.

SUMMARY OF THE INVENTION

Briefly, the invention provides a vehicle anti-theft device for use with a vehicle having a gear lever extending from a base. The device includes a removable housing for receiving and enclosing the gear lever, a housing retaining element adapted to cooperate with the gear lever, and means for releasably locking the retaining element to the housing to inhibit movement of the gear lever.

The invention further provides a vehicle anti-theft device which comprises a removable housing for the gear lever of the vehicle, the housing having a base adapted for resting on the base of the vehicle or an extension thereof when the housing is in use; a first housing retaining element mountable on the gear lever; and a second housing retaining element operatively associated with the housing and adapted for interengaging with said first element when the housing is in use; and means for releasably locking said second element to the housing so that when in use, the device inhibits movement of the gear lever.

The invention further still provides an anti-theft device for a vehicle having a gear lever with a handle and extending from a base. The device includes a first housing with an open end and a closed end, for receiving and enclosing the gear lever and a housing retaining element comprising a plate and first an second parallel bolts extending therefrom. A pair of opposed holes are formed in the housing in mutual register to receive the first bolt adjacent to one side of the gear lever and below the handle, and another hole is also formed an the housing to receive the second bolt adjacent the opposite side of the gear lever and below the handle thereof. There is also included a barrel lock in a lock housing fixedly attached to the first housing and adapted to releasably lock the first bolt with the retaining element in engagement with the gear lever to inhibit movement thereof. Preferably, the first bolt is of sufficient length to extend from the plate through the opposed holes into the lock housing and has a diametrically disposed hole for receiving a bolt-engaging portion of the lock, and the second bolt is of sufficient length to be entirely received within the first housing, i.e. it may abut but does not penetrate the housing opposite the hole an which it is received.

The invention will be understood in greater detail from the following description of a preferred embodiment thereof given by way of example only and with reference to the accompanying drawings.

DESCRIPTION OF THE DRAWINGS

FIG. 1 is a first perspective view of a device according to the invention;

FIG. 2 is a second perspective view of the device of FIG. 1;

DESCRIPTION OF THE PREFERRED EMBODIMENTS

Figure 3:
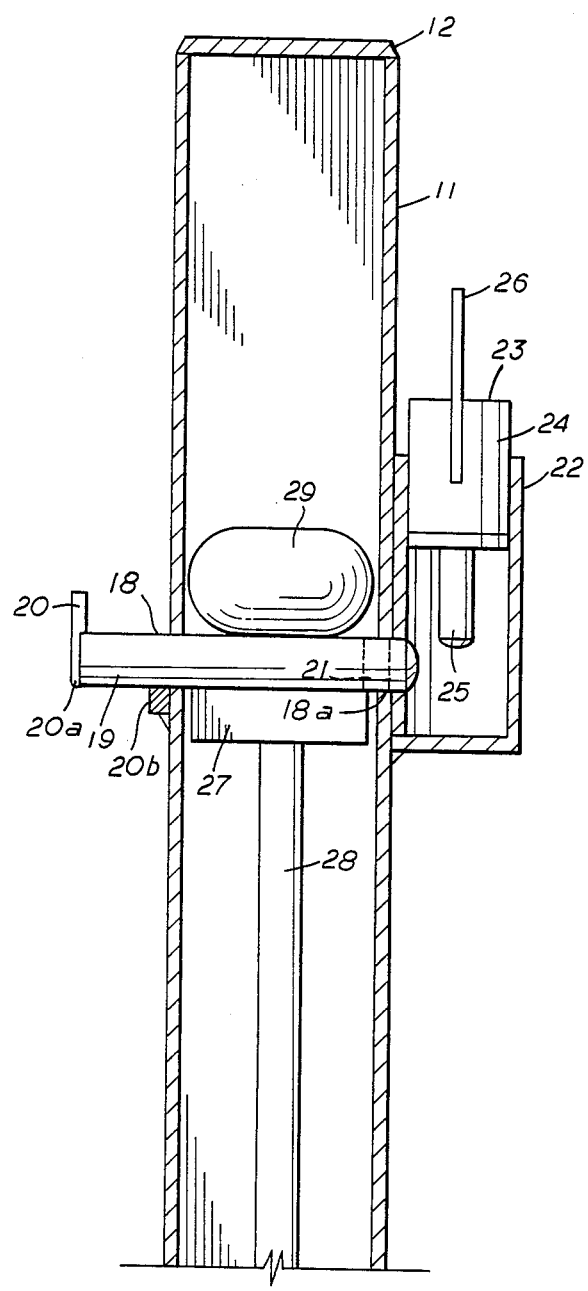
FIG. 3 is a cutaway view of the device of FIG. 1 in a first position of use taken along the line 3—3 and viewed in the direction of the arrows.

Referring now to the drawings (FIGS. 1-4), there is shown a vehicle anti-theft device 10 according to the invention which device comprises a gear lever housing 11 which is closed at one end 12. The other end 13 of the housing 11 is open mouthed and has projecting therefrom a pair of wing members 14, 15 each of which supports a respective L-shaped bracket 16, 17. Located in the housing is a pair of holes 18, 18a which are in mutual register for receiving a bolt 19 of substantially circular cross-section and having a head 20 at one end thereof and a diametrically disposed hole 21 at the other end thereof.

The head 20 is of generally circular cross-section having a diameter greater than the hole 18. However, one part 20a of the head 20 is straight in cross-section and thus flat so as to engage with a projection 20b of the housing 11 and located near the hole 18.

Fixedly attached to the housing 11 is a barrel lock housing 22 having a barrel lock 23 of a well known type therein. The barrel lock 23 will not be described in detail here as such locks are well known to those skilled in the art. Briefly, the barrel lock 23 essentially comprises a lock portion 24 of the plunger type having a bolt engaging portion 25. With the lock portion 24 in the position shown in FIG. 4 of the drawings, (referred to as the locked condition) the lock portion 24 may only be released to the position shown in FIG. 3 of the drawings (referred to as the unlocked condition) by the insertion and the turning of a correct key 26. To place the lock portion 24 in the locked condition from the unlocked condition, the key 26 is not required and it is only necessary to push the lock part 24 downwards sufficiently to place it in the locked condition.

When the bolt 19 is fully inserted into the housing 11, it should have sufficient length to pass through the hole 18a and penetrate the barrel lock housing 22. With the flat part 20a of the bolt 19 engaged with the projection 20b thereby preventing rotation of the bolt 19, the hole 21 should be in register with the bolt engaging portion 25 of the barrel lock 23. Thus, with the lock portion 24 in the locked condition, the bolt engaging portion 25 will have penetrated the hole 21 thereby preventing the withdrawal of the bolt 19.

In use, a retaining element 27 is fixedly attached to a gear lever 28 of a vehicle. The element 27 is attached at an appropriate location having regard to the type of gear lever 28. On some gear levers, particularly of the type used in vehicles having automatic or semiautomatic transmission, such an element 27 may be present in the form of a movable member adapted for enabling a gear to be selected.

With the gear lever 28 in a selected position, the housing 11 is placed over the gear lever 28 and the housing 11 is lowered in the direction of the base or floor of the vehicle or an extension thereof until such time as the brackets 16, 17 rest thereon. The shape and/or form of the brackets 16, 17 will be determined having regard to the model or type of vehicle and in some cases may not be required at all. In any event, the design of the housing 11 and the location of both the holes 18, 18a and the retaining element 25 should be such that when the bolt 19 is inserted through the holes 18, 18a, the bolt 19 passes above the retaining element 27 and below the knob 29 of the gear lever 28.

Figure 4:
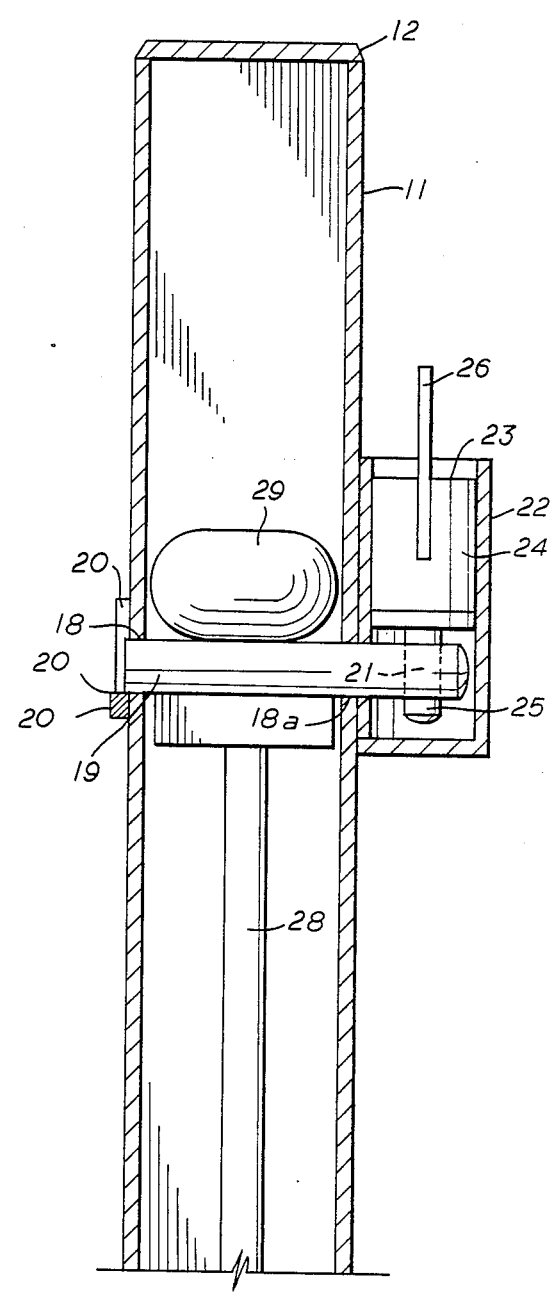
FIG. 4 is the device of FIG. 3 in a second position of use.
Figure 5:
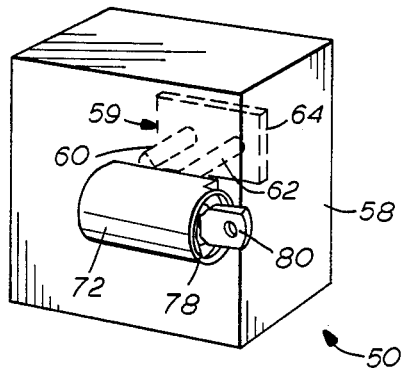
FIG. 5 is a first perspective view of an alternate embodiment of a device according to the invention.
Figure 6:
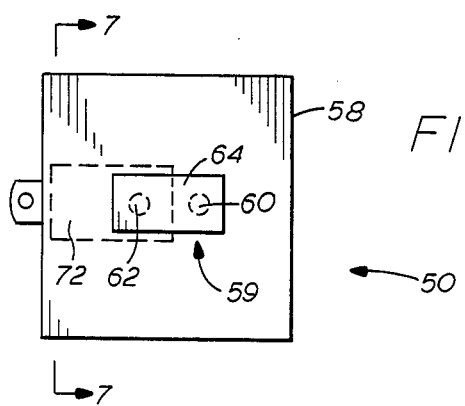
FIG. 6 is a second perspective view of the device of FIG. 5.

With the bolt 19 in the position shown in FIG. 4 of the drawings, the lock portion 24 is placed in the locked condition. The distance between the retaining element 27 and the knob 29 should be sufficient to enable the bolt 19 to pass smoothly therebetween while at the same time preventing any appreciable vertical or substantially vertical movement of the housing 11 relative to the gear lever 28.

With the device 10 in use as described above, movement of the gear lever 28 is now virtually impossible. In the case of a vehicle having a manual gear change, fourth, fifth, or reverse gear should preferably be selected. In the case of a vehicle having an automatic gear change, "park" should be selected.

The device 10 may be quickly and easily removed by reversing the steps of placing the device 10 into the in use condition described above.

The barrel lock housing 22 may be in a horizontal position rather than the vertical position as shown in the drawings. In that event, the hole 21 of the bolt 19 would be oriented horizontally rather than vertically, as in the present embodiment, when the bolt 19 is in the position shown in FIG. 4 of the drawings.

Referring now to the alternative embodiment seen in the drawings (FIGS. 5–8), there is illustrated an embodiment of an anti-theft device 50 for use in an automobile equipped with an automatic gear shift lever 52 extending from a base or console of the vehicle and provided with a handle 54 and a button 56 which enables gear selection. In this embodiment, a housing 58 is provided having substantially rectangular cross-section to accommodate the handle 54. Instead of the single-bolt retaining element described in reference to FIGS. 1–4, the device 50 is provided with a retaining element 59 comprising a pair of parallel bolts 60, 62 spaced apart to engage the lever 52 therebetween. In use, the housing 58 need not rest on the base or console from which the gear lever 52 extends, but should be sufficiently close thereto to prevent unauthorized entry into the housing 58.

Figure 7:
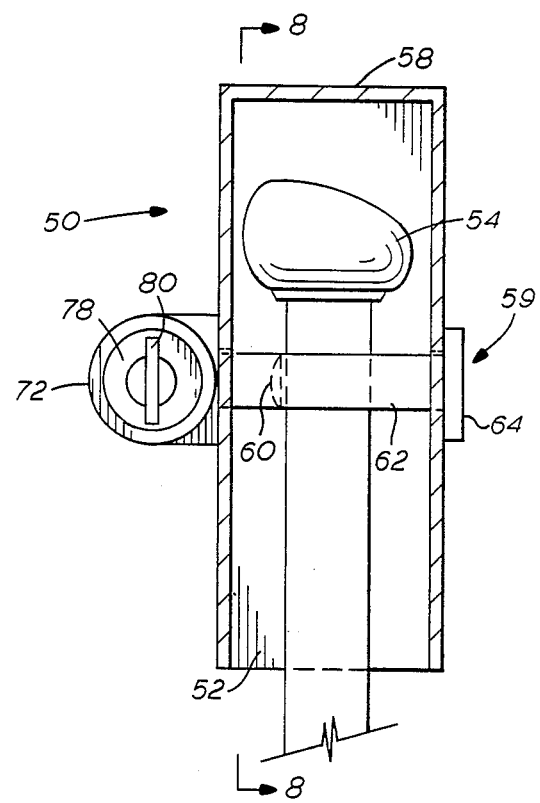
FIG. 7 is a cutaway view of the device of FIG. 5 in a first position of use taken along the lines 7—7 and viewed in the direction of the arrows.
Figure 8:
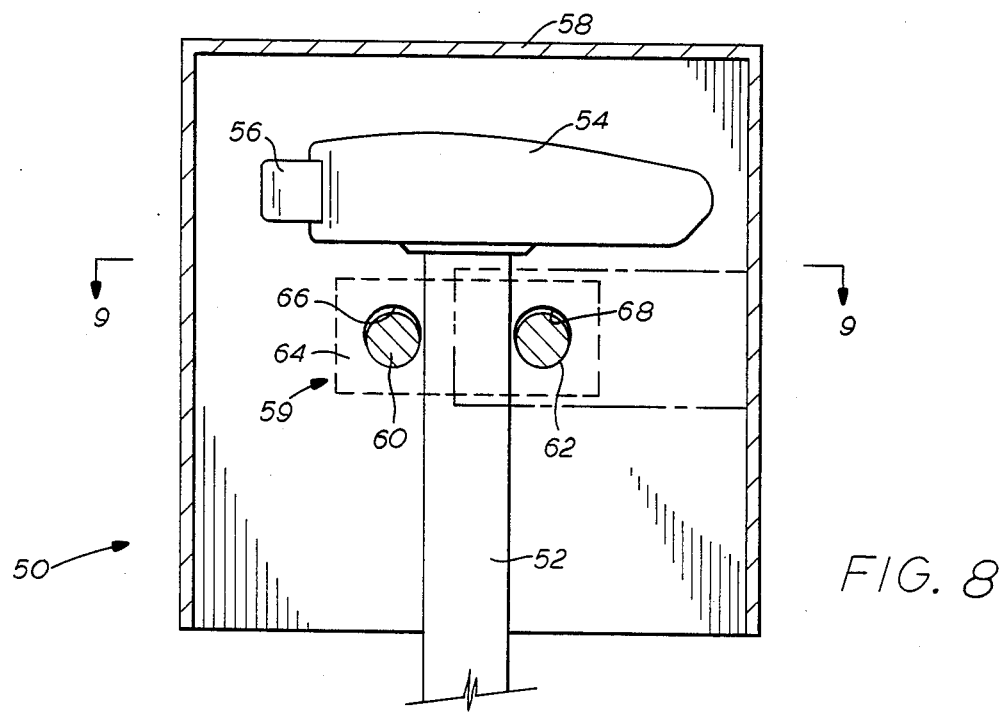
FIG. 8 is a cutaway view of the device of FIG. 7 taken along lines 8—8 and viewed in the direction of the arrows.
Figure 9:
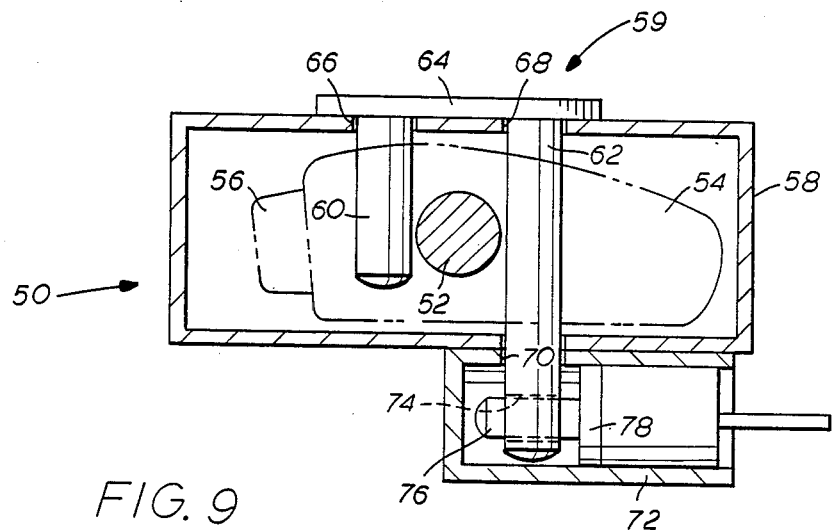
FIG. 9 is a cutaway view of the device of FIG. 8 taken along the lines 9—9 and viewed in the direction of the arrows.
Figure 10:
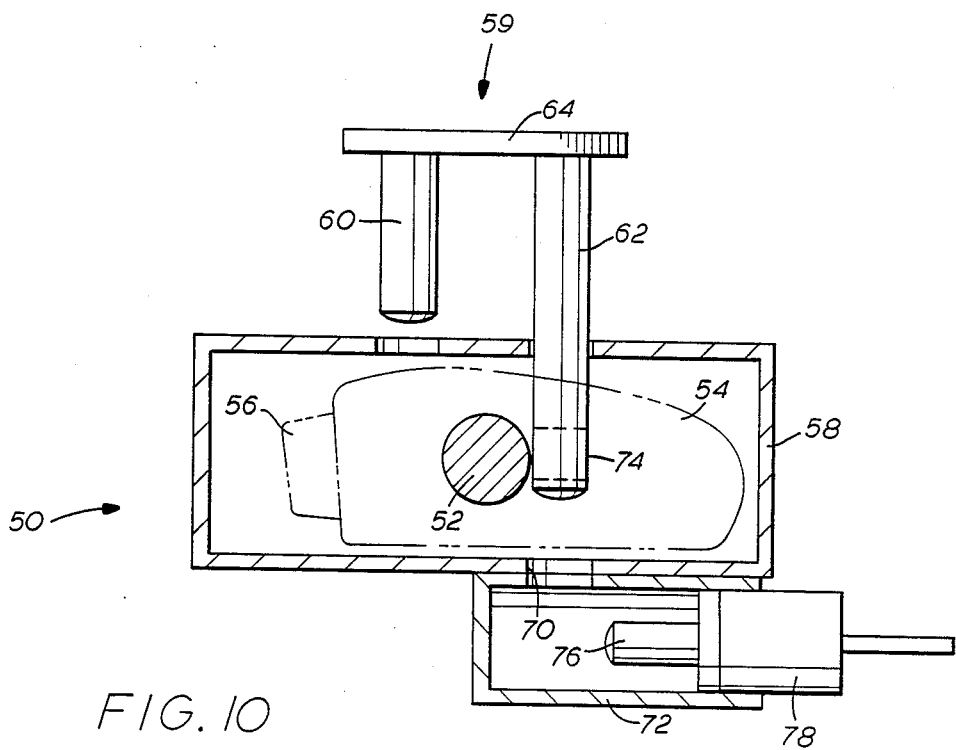
FIG. 10 is the device of FIG. 9 in a second position of use.

The bolts 60, 62 have a substantially circular cross-section and extend from a common head or plate 64. The housing 58 is provided with a hole 66 for receiving the bolt 60 and a pair of holes 68, 70 for receiving the bolt 62. The bolt 60 is relatively shorter than the bolt 62 so that it is entirely received within the housing 58 when the plate 64 of the retaining element 59 is abutted against the housing 58 as best illustrated in FIGS. 7 and 9. However, the bolt 62 has sufficient length to extend through the holes 68, 70 into a barrel lock housing 72 fixedly attached to the housing 58. The portion of the bolt 62 extending into the lock housing 72 is provided with a diametrically disposed hole 74 for receiving a bolt engaging portion 76 of a plunger-type lock 78 disposed with the lock housing 72.

The cooperation of the lock 78 and the bolt 62 is essentially the same as that of the lock 23 and bolt 19 described above in reference to FIGS. 1–4. In use, the bolts 60, 62 are locked in place by the lock 78. The bolts 60, 62 substantially prevent vertical movement of the housing 58 so that the gear lever 52 is rendered inoperable since the housing 58 prevents access to, and depression of the button 56 required to shift gears. At the same time, the bolts 60, 62 prevent substantial lateral movement of the housing 58 which might otherwise be sufficient to depress the button 56 and enable gear shifting. Thus, if the housing 58 is locked in place on the gear lever 52 placed in the "park" or "neutral" positions, the vehicle cannot be drive until the lock 78 is unlocked with the proper key 80 and the retaining element 59 and the housing 58 are removed.

If desired, the device 50 may also include trim for an attractive appearance, and/or padding on sharp edges and surfaces of the device 50 in contact with the gear lever or console.

There is thus provided a relatively simple and inexpensive vehicle anti-theft device.

The invention is not limited by or to the specific embodiments described which can undergo considerable variation without departing from the scope of the invention.

We claim:

1. A vehicle anti-theft device for a vehicle having a gear lever extending from a base, comprising:
   a removable housing for receiving and enclosing the gear lever having a pair of opposed holes in mutual register therein to engage a retaining element;
   a housing retaining element including a bolt extendable through said holes and adapted to cooperate with the gear lever; and
   means for releasably locking the retainer element to the housing to inhibit movement of the gear lever including a barrel lock fixedly attached to the housing and adapted to lock the bolt in position to inhibit movement of the gear lever.

2. The device of claim 1, wherein the housing is adapted to enclose a gear lever extending through the floor of the vehicle or an extension thereof.

3. The device of claim 1, wherein said vehicle has a manual transmission and the housing is adapted to enclose the gear lever in a high gear position.

4. The device of claim 1, wherein the vehicle has an automatic transmission and the housing is adapted to enclose the gear lever in "park" position.

5. A vehicle anti-theft device for a vehicle having a gear lever mounted on a base, comprising:
   a removable housing for the gear lever having a base adapted to rest on the base of the vehicle or an extension thereof, the housing having a pair of opposed holes for receiving a bolt;
   a first housing retaining element mountable on the gear lever;
   a second housing retaining element operatively associated with the housing and adapted to interengage with the first element, the second element including a bolt having a head at one end and diametrically disposed hole at the other, the bolt being extendable through the holes in the housing with the head abutting the housing at one hole; and means for releasably locking the second element to the housing to inhibit movement of the gear lever, the locking means including a barrel lock in a barrel lock housing fixedly attached to the housing and being penetrable by the diametrically disposed hole in the bolt.

6. The device of claim 5, wherein the base of the housing has a pair of opposed wing members each supporting a bracket.

7. The device of claim 5, wherein the barrel lock comprises a plunger type lock portion and a bolt-engaging portion in register with the diametrically disposed hole of the bolt.

8. The device of claim 7, wherein the head has a flat side and the housing has a projection for engaging the flat side of the head of the bolt to prevent rotation thereof.

9. The device of claim 5, wherein the gear lever has a knob on the end, and wherein the holes in the housing and the retaining element are positioned for receiving the bolt above the retaining element and below the knob.

10. A vehicle anti-theft device for a vehicle having a gear lever with a handle and extending from a base, comprising:

a first housing with an open end and a closed end, for receiving and enclosing the gear lever;

a housing retaining element including a plate and first and second parallel bolts extending therefrom;

a pair of opposed holes formed in the housing in mutual register to receive the first bolt adjacent to one side of the gear lever and below the handle thereof;

a hole formed in the housing to receive the second bolt adjacent the opposite side of the gear lever and below the handle thereof; and a barrel lock in a barrel lock housing fixedly attached to the first housing and adapted to releasably lock the first bolt with the retaining element in engagement with the gear lever to inhibit movement thereof.

11. The device of claim 10, wherein the first bolt is of sufficient length to extend from the plate through the opposed holes into the barrel lock housing and has a diametrically disposed hole for receiving a bolt-engaging portion of the barrel lock.

12. The device of claim 11, wherein the second bolt is of sufficient length to be entirely received within the first housing.

* * * * *